Oct. 6, 1953 — M. C. TURKISH — 2,654,454
MAGNETIC CLUTCH
Filed May 15, 1950 — 2 Sheets-Sheet 1

INVENTOR.
MICHAEL C. TURKISH
BY McDonald & Fragno
ATTORNEYS

Oct. 6, 1953 M. C. TURKISH 2,654,454
MAGNETIC CLUTCH
Filed May 15, 1950 2 Sheets-Sheet 2
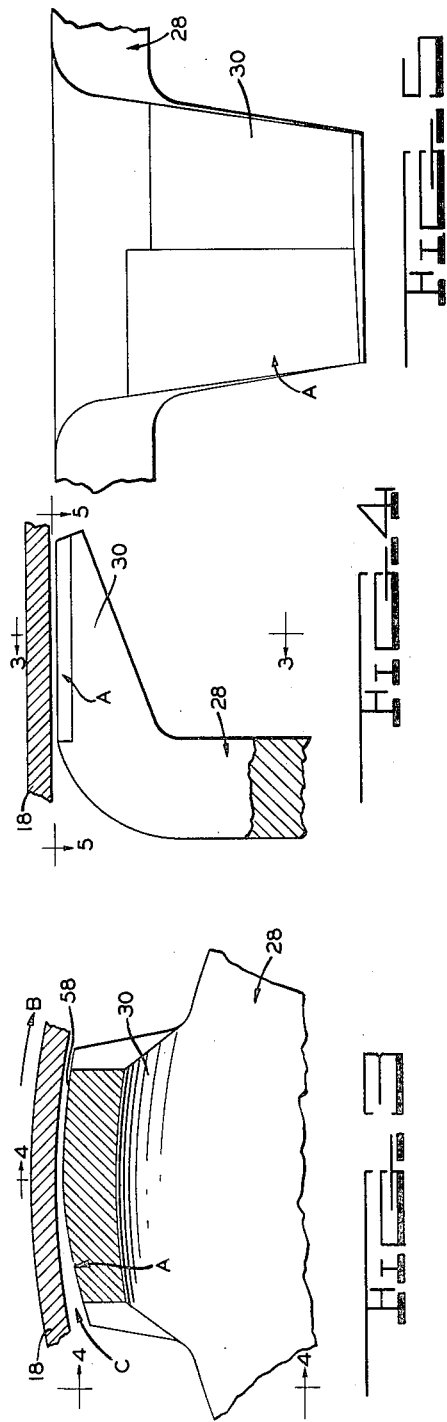
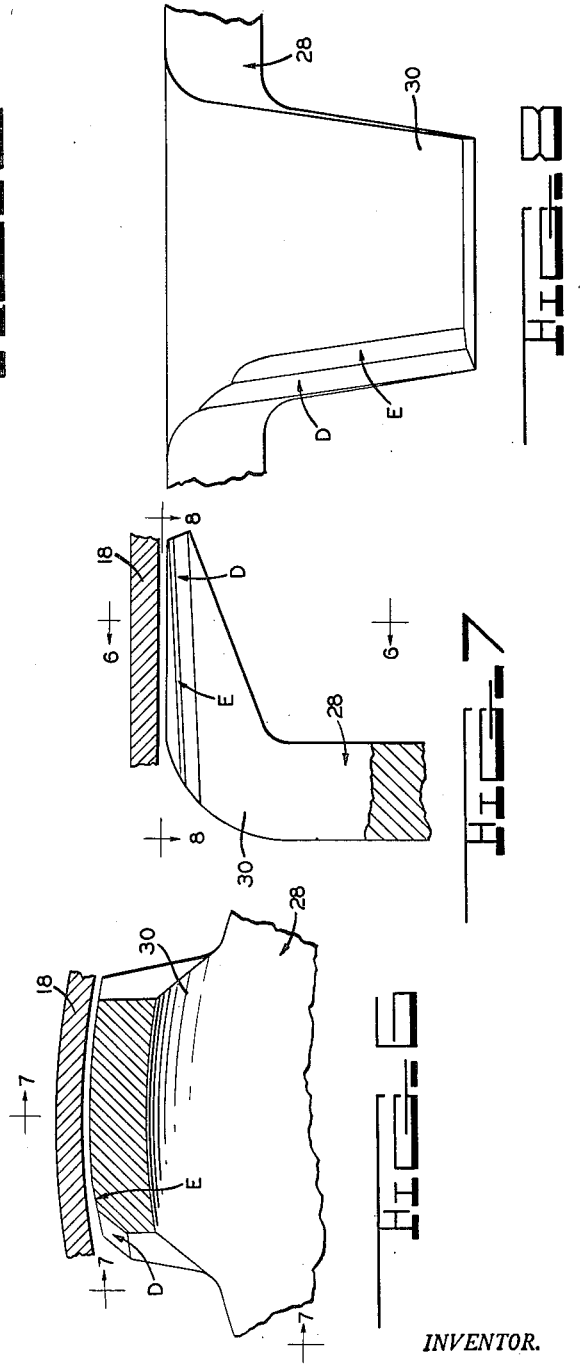
INVENTOR.
MICHAEL C. TURKISH
BY McDonald & Seagro
ATTORNEYS Patented Oct. 6, 1953

2,654,454

UNITED STATES PATENT OFFICE 2,654,454

MAGNETIC CLUTCH

Michael C. Turkish, Centerline, Mich., assignor to Eaton Manufacturing Company, Cleveland, Ohio, a corporation of Ohio Application May 15, 1950, Serial No. 161,954

7 Claims. (Cl. 192—21.5)

This invention relates to magnetic power transmitting mechanisms and more particularly to magnetic clutches employing powdered magnetic material as a mechanical friction bridging medium in the gap between the relatively rotatable elements of the clutches.

Broadly the invention comprehends the provision of a magnetic clutch for transmitting power having spaced relatively rotatable coupling elements adapted to be magnetically coupled together and physically mechanically clutched together through the medium of a finely divided magnetic material operative in the space between the relatively rotatable coupling elements of the clutch and wherein specific provision is made in the design of one of the coupling elements to provide a mechanical wedge effect between the coupling elements in the reception of the magnetic material therebetween so as to provide high torque capacity operation of the clutch when the clutch is energized and a quick release therebetween when deenergized.

Among the objects of this invention are to provide a magnetic clutch employing magnetic material as a torque capacity increasing coupling agent therein that affords increased torque transmitting capacity for a given magnetic field strength and permits a quick release upon deenergization thereof, and that incorporates cooperating drum and rotor members, said rotor being of the interdigitated tooth type with the leading edge of each tooth in its direction of rotation related to the drum being chamfered to a certain predetermined degree so as to present in effect with the internal peripheral surface of the drum a wedge.

Other and further important objects and advantages of this invention will be apparent from the following description taken in connection with the drawings forming a part of the specification and in which:

Fig. 4 is a side elevation view of the tooth of Fig. 3 taken substantially along lines 4—4 thereof;

Fig. 5 is a top elevation view of the tooth of Fig. 4 taken along substantially lines 5—5 thereof;

Fig. 6 is a fragmentary enlarged partially cross-sectional view of a modified form of tooth taken substantially along lines 6—6 of Fig. 7;

Fig. 7 is a side elevation view of the tooth of Fig. 6 taken substantially along lines 7—7 thereof;

Fig. 8 is a top elevation view of the tooth of Fig. 7 taken substantially along lines 8—8 thereof; and Fig. 9 is a fragmentary enlarged partially cross-sectional view similar to Fig. 3 with the members thereof reversed as to being the driving member.

Similar reference characters indicate corresponding parts through the several views of the drawings.

Figures 1, 2, 3:
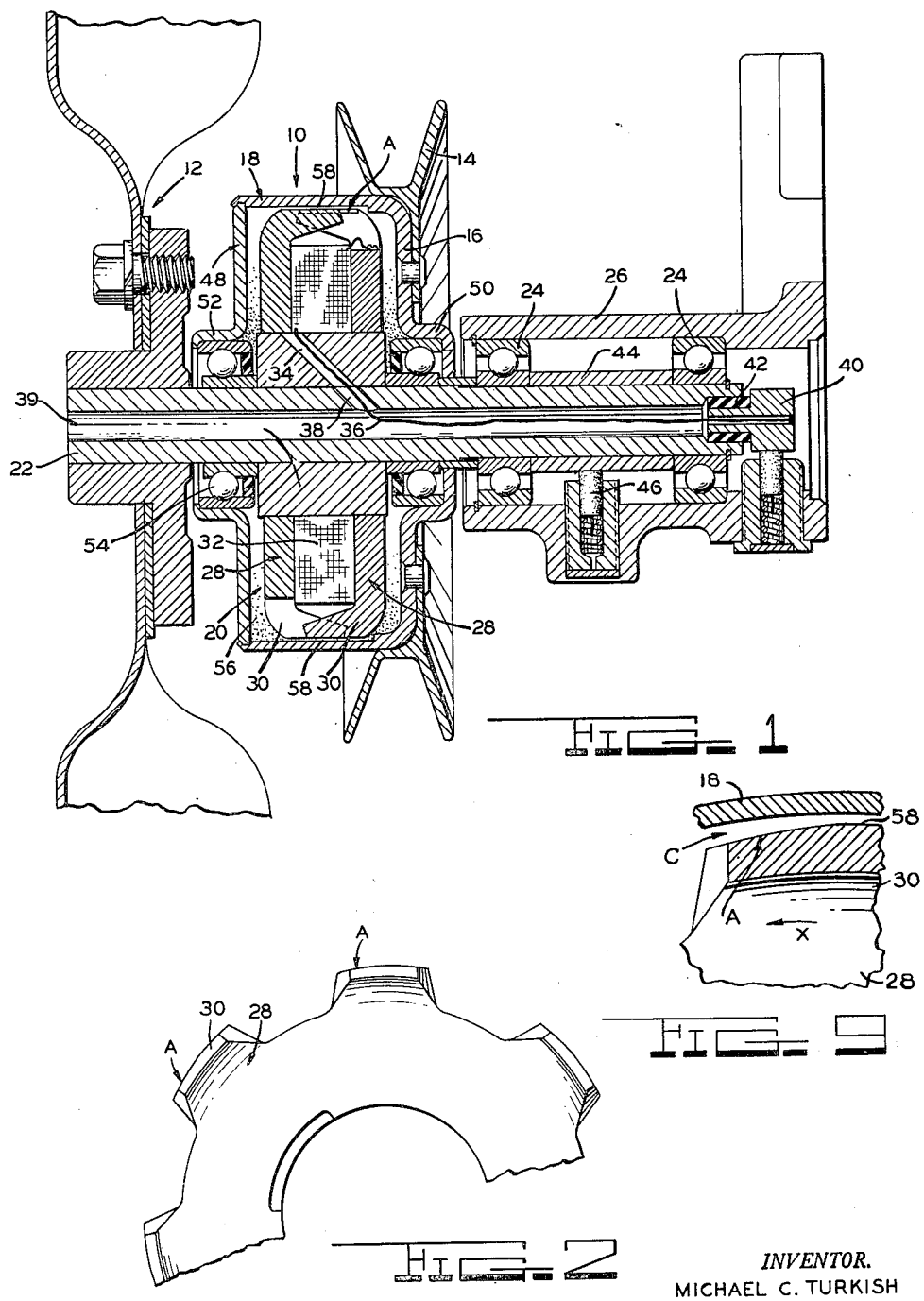
Fig. 1 is a vertical cross-sectional view of a magnetic clutch, embodying the invention as applied to the driving of a vehicle air distributing fan.
Fig. 2 is a fragmentary elevation view of one of the toothed magnetic flux carrying members forming part of the clutch rotor of Fig. 1.
Fig. 3 is a fragmentary enlarged partially cross-sectional view of one tooth of a member of Fig. 2 taken substantially along lines 3—3 of Fig. 4.

The presently devised magnetic clutch is directed at the provision of a clutch of the general type disclosed by the co-pending application of H. J. Findley filed June 4, 1949, which materialized into Patent No. 2,519,449 on August 22, 1950, comprising two relatively rotatable coupling coupling elements one generally designated a rotor and the other a drum and employing a finely divided magnetic material operative upon the magnetic energization of the clutch to provide a physical mechanical bridge in the gap between the coupling elements so as to achieve a torque transmitting synchronous operation thereof and wherein through the innovation of structure as hereinafter defined, the torque transmitting capacity for a given magnetic field strength is increased and furthermore the rotor and drum coupling elements operate immediately to be released from one another when the clutch is deenergized.

Increased torque transmitting capacity and quick release for a magnetic clutch of this type is achieved with regard to the rotor thereof wherein said rotor is of the form made up of a pair of oppositely disposed magnetic flux carrying members having teeth on their external surface axially extended to one another so as to present a unitary interdigitated tooth structure and wherein a chamfer is provided on the leading edge of each tooth in the direction of relative rotation between the rotor and drum. With the provision for annular clearance or gap between the external periphery of the teeth of the rotor and the internal periphery of the drum associated therewith, the chamfer on the leading edges of the rotor teeth as related to the drum provide a wedge effect with the drum in the reception of the finely divided magnetic material in the annular gap between the drum and rotor for the physical mechanical operation thereof, to clutch the rotor and drum together, when a magnetic field is established therebetween. The magnetic material to be used in this clutch is to be alike to that disclosed in H. J. Findley application Ser. No. 97,269 such as a mixture of the order of 50–50 by volume of Carbonyl E iron and graphite. An amount of magnetic material is used which is sufficient to bridge the annular gap between the external periphery of the teeth of the rotor and the inner periphery of the drum, and yet is insufficient to fill all of the space in the drum so that there will be space available for the material to fall away from its driving position on deenergization in order to provide a very rapid release from the driving condition.

Referring particularly to Fig. 1 of the drawings for more specific details of the invention 10 represents generally a magnetic clutch as applied to the driving of a distributing fan 12 in a vehicle from the vehicle engine by way of pulley 14 directly mounted to the radial flange 16 of drum or input member 18 of the clutch.

The clutch 10 in addition to the drum 18 includes a rotor or output 20 member connected by a shaft 22 thereof to the fan 12. The shaft 22 also extends in an axial direction opposite to the fan mounting end and is journalled in bearings 24 mounted in a stationary sleeve 26 adapted to be associated with the vehicle engine, not shown.

The rotor comprises a pair of flux carrying members 28 having a plurality of circumferentially spaced axially extended polar teeth 30 on their external periphery and arranged in oppositely disposed relation to one another with the teeth in overlapping relation to one another so as to provide an external periphery interdigitated tooth structure. Said members 28 are fixedly mounted upon an annular rotor hub 30 and enclose therein with the hub an annular coil winding 32. The hub 30 is fixedly secured to the shaft 22 for rotation therewith and is provided with a passage 34 therein through which a lead 36 from the coil extends, said lead in turn extending through a passage 38 in the surface of the shaft communicating with the passage in the hub, and thence through an axial bore 39 in the shaft for connection at its free end with a current conducting plug or ring 40 fixed in the end of the shaft and insulated therefrom by an insulation sleeve 42 interposed between the plug and shaft. The other end of the coil is adapted to be connected to one of the members 28 for ground connection by way of the rotor, shaft and a sleeve 44 mounted on the shaft axially interposed between the bearings 24 with a ground connection brush 46. Current is supplied to the coil for the energization thereof and the creation of a flux path between the rotor and drum from a suitable source of electrical power, not shown.

The drum and rotor as shown by Fig. 1 are so related to one another that the drum in association with an end plate 48 mounted thereon completely encloses the rotor therewithin with the hub 50 of the drum and hub 52 of the end plate journalled on suitable bearings 54 which are mounted on the shaft 22 disposed on axial opposite sides of the rotor, said bearings in turn being provided with suitable seals so as to provide in conjunction with the drum and end plate an effectively sealed housing for the reception of finely divided powdered magnetic material 56, in the order of 10 to 1 by weight of carbonyl iron and graphite, therein to be utilized in the attainment of synchronous operation between the drum and rotor.

As shown by Fig. 1 an air gap or annular clearance space 58 is provided between the drum and rotor teeth into which the magnetic material is magnetically attracted for the subsequent physical mechanical action thereof in effectively clutching the rotor and drum together for the synchronous operation thereof. With the energization of the coil 32 and the establishment of a magnetic flux field between the drum and rotor the magnetic material becomes packed between the rotor and drum and in effect mechanically frictionally locks the drum and rotor together, said magnetic field operating as a binder to hold the magnetic material in a compact structure, as in the form of a brake or clutch lining bridging the air gap between the drum and rotor.

It has been discovered for the purpose of increasing the torque transmitting capacities of magnetic clutches of the generally magnetic material employing type that by chamfering the leading edge of each rotor tooth, as designated by A of the teeth of members of 28, wherein the chamfer gradually extends from the leading edge to the midpoint thereof and across the external periphery thereof as more clearly shown by Fig. 3 through 5, a wedge effect is produced between the inner peripheral surface of the drum and the chamfered portion of each tooth. The leading edge of the tooth is taken to represent that portion of the tooth presenting itself in the relative rotation of the drum thereof, such as shown by Fig. 3 wherein the drum is the driving member and rotated in the direction B relative to the rotor which is constituted the driven member. With the rotation of the drum in direction B and the coil energized the magnetic material will become wedged in the wedge shaped space C between the drum and rotor teeth and thus afford a higher torque transmitting capacity for the clutch than would otherwise be the case if no wedge effect was provided. Furthermore because of the utilization of the chamfer on the rotor teeth, a desirable quick release or break away can be had between the drum and rotor when the coil is deenergized and no further magnetic flux or binder for the magnetic material is present the magnetic material is again returned to its loose or free flowing state ineffective to mechanically transmit any torque or effect any clutching action between the drum and rotor.

Fig. 9 illustrates the comparative arrangement of the rotor to the drum with the rotor as the driving member being rotated in the direction of the arrow X such that the chamfered edge of the rotor in both instances of Figs. 3 and 9 is the leading edge thereof wherein the drum as the driving member is rotated in an opposite direction to the rotor as the driving member.

Figs. 6 through 8 illustrate a modified form of chamfer for the rotor teeth wherein instead of a gradual chamfer as shown by Figs. 3 through 5 a double more pronounced chamfer is provided including an abrupt short chamfer D at the leading edge of the tooth and a second made gradual but short chamfer E directly connected in adjoining relation to the chamfer D is provided wherein the both chamfers together extend in a circumferential direction only about one quarter of the distance across the circumferential width of the tooth. This chamfer form is operative in a like effect to the chamfer on the tooth of Figs. 3 through 5, but although it is not as effective for torque transmitting capacity of the clutch a more positive and assured release or break away of the drum from the rotor can be attained possibly due in part to the fact that no efficient column for mechanical support of the magnetic material is had at the leading edge of the tooth, when the coil is deenergized, thereby permitting a gravitational falling away therefrom more readily than would be the case with the tooth form of Figs. 3 through 5, due to the fact that the effective wedge action is shortened and is more angular. The flux path through the magnetic material is longest at the chamfered leading edge so that the flux density there is at a minimum, which, when coupled with the lack of a firm mechanical support for the material, causes a rapid gravitational falling away of the magnetic material on deenergization giving a rapid release. Such action is more pronounced with the more sharply angled chamfer shown in Figures 6 through 8, though it is also operative with the tooth form of Figures 3 through 5.

Although the present invention has been illustrated specifically with regard to its application, that is as to the type of equipment to which applied, the utilization as a clutch, and the arrangement of rotor to drum, it is readily suitable to adoption for other equipment. It may readily be adapted to braking application and may be employed as hereinbefore defined or may even have the parts reversed wherein the rotor is the driving member and the drum is the driven member. Irregardless of whether the drum or rotor is the driving member the chafers on the individual rotor tooth still will be placed on the leading edges to cause a wedge action to occur between the rotor teeth and drum surface. Although specific chamfer forms are shown, it is realized that any of several different modifications thereof could possibly be equally as efficient for the results desired. Therefore, the invention is to be limited only to the extent of the appended claims.

What I claim is:

1. A magnetic clutch comprising a rotatable magnetic member having a hollow cylindrical surface, a second rotatable member having a plurality of circumferentially spaced interdigitated teeth, the outer peripheral surfaces of which lie in a common cylindrical zone closely spaced with respect to the cylindrical surface of the first rotatable magnetic member and defining an annular space therebetween, a flowable finely divided magnetic fluid mixture in the space between the rotatable members in an amount sufficient to bridge the said annular space but insufficient to completely fill the first cylindrical rotatable member, said teeth each being chamfered on their leading edges as related to the first rotatable member and means for producing a magnetic field between said members whereby said fluid mixture is drawn into the space between the surfaces of the teeth and the cylindrical surface of the first rotatable member.

2. A claim according to claim 1 wherein the chamfer extends in a gradual slope from the leading edge to about the midpoint of each tooth inclined radially inward from the cylindrical zone of the peripheral surfaces of the interdigitated teeth.

3. A claim according to claim 1 wherein the chamfer includes two stages, an abrupt angular portion on the leading edge and an adjacent less angular portion extending from the termination of the first angular portion toward the midpoint of the tooth.

4. A magnetic clutch comprising relatively rotatable magnetic driving and driven members, one of said members having a smooth cylindrical surface and said other member having a plurality of circumferentially spaced interdigitated teeth arranged in a circular zone with the major portion of their peripheral surfaces spaced apart a predetermined annular distance from the cylindrical surface of the first member, the leading edge of each tooth as related to the other member having a chamfer inclined away from the cylindrical surface extending from substantially the midpoint of the tooth to the leading edge thereof, a flowable finely divided magnetic fluid mixture in the annular space between the members in an amount sufficient to substantially fill said annular space but insufficient to fill other space defined between said driving and driven members, and means for producing a flux field interlinking the members.

5. A magnetic clutch comprising a rotatable magnetic member having a hollow smooth cylindrical surface, a rotatable magnetic field member carrying an annular excitation coil and having a plurality of circumferentially spaced alternately arranged opposite polarity interdigitated teeth, said teeth each having the major portion of the peripheral surface laying in annular spaced parallel relation to the cylindrical surface of the first rotatable magnetic member and another peripheral portion on the leading edge, as related to the magnetic member, angularly inclined to the major portion of the peripheral surface, and a flowable finely divided magnetic fluid mixture in the annular space between peripheral surfaces of the teeth and the cylindrical surface of the first rotatable magnetic member, the amount of said fluid mixture being insufficient to completely fill all spaces in said rotatable magnetic member whereby the fluid mixture may in one position occupy said annular space and in a second position substantially vacate said annular space.

6. A claim according to claim 5 wherein the inclined peripheral portion of each tooth includes a steep angular portion at the leading edge of the tooth and an adjacent slight angular portion.

7. A claim according to claim 6 wherein the angular portions constitute a small area of the peripheral surface of each tooth.

MICHAEL C. TURKISH.

References Cited in the file of this patent

UNITED STATES PATENTS

| Number | Name | Date |
|---|---|---|
| 2,519,449 | Findley | Aug. 22, 1950 |

FOREIGN PATENTS

| Number | Country | Date |
|---|---|---|
| 78,477 | Sweden | Sept. 26, 1933 |
| 385,894 | Great Britain | Jan. 5, 1933 |